(12) United States Patent
Han et al.

(10) Patent No.: US 8,275,039 B2
(45) Date of Patent: Sep. 25, 2012

(54) METHOD OF AND APPARATUS FOR VIDEO ENCODING AND DECODING BASED ON MOTION ESTIMATION

(75) Inventors: Woo-jin Han, Suwon-si (KR); Kyo-hyuk Lee, Yongin-si (KR); Tammy Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1324 days.

(21) Appl. No.: 11/936,128

(22) Filed: Nov. 7, 2007

(65) Prior Publication Data

US 2008/0107181 A1    May 8, 2008

Related U.S. Application Data

(60) Provisional application No. 60/857,119, filed on Nov. 7, 2006.

(30) Foreign Application Priority Data

Jan. 18, 2007  (KR) .................. 10-2007-0005806

(51) Int. Cl.
    *H04N 7/12* (2006.01)
(52) U.S. Cl. .................................. 375/240.16; 382/236

(58) Field of Classification Search .................. None
See application file for complete search history.

(56) References Cited

U.S. PATENT DOCUMENTS

| | | | |
|---|---|---|---|
| 2003/0113026 A1* | 6/2003 | Srinivasan et al. | 382/239 |
| 2004/0086047 A1* | 5/2004 | Kondo et al. | 375/240.16 |
| 2005/0013498 A1* | 1/2005 | Srinivasan et al. | 382/239 |

FOREIGN PATENT DOCUMENTS

| | | |
|---|---|---|
| EP | 1072017 B1 | 9/2004 |
| JP | 9261654 A | 10/1997 |
| JP | 1042297 A | 2/1998 |
| JP | 2000308064 A | 11/2000 |

* cited by examiner

*Primary Examiner* — Gregory Sefcheck
*Assistant Examiner* — Minh-Trang Nguyen
(74) *Attorney, Agent, or Firm* — Sughrue Mion, PLLC

(57) ABSTRACT

Provided is a method of and apparatus for video encoding and decoding based on motion estimation. The method includes generating a motion vector by searching a reference picture using pixels of a current block, generating a prediction motion vector that is a prediction value of the motion vector by searching the reference picture using previously encoded pixels located adjacent to the current block, and encoding the current block based on the motion vector and the prediction motion vector. By accurately predicting the motion vector of the current block, the number of bits required for encoding the motion vector can be reduced, thereby improving the compression rate of video data.

21 Claims, 8 Drawing Sheets

REFERENCE PICTURE            CURRENT PICTURE

METHOD OF AND APPARATUS FOR VIDEO ENCODING AND DECODING BASED ON MOTION ESTIMATION

CROSS-REFERENCE TO RELATED PATENT APPLICATION

This application claims the benefit of Korean Patent Application No. 10-2007-0005806, filed on Jan. 18, 2007, in the Korean Intellectual Property Office, and the benefit of U.S. Provisional Patent Application No. 60/857,119, filed on Nov. 7, 2006, in the U.S. Patent and Trademark Office, the disclosures of which are incorporated herein in their entirety by reference.

BACKGROUND OF THE INVENTION

1. Field of the Invention

Methods and apparatuses consistent with the present invention generally relate to video encoding and decoding, and more particularly, to accurately predicting a motion vector of the current block in the encoding of the current block.

2. Description of the Related Art

In video compression standards such as moving picture expert group (MPEG)-1, MPEG-2, MPEG-4, H.264/MPEG-4, AVC (Advanced Video Coding) standards, a picture is divided into macroblocks for video encoding. Each of the macroblocks is then encoded using inter prediction or intra prediction. Next, an optimal encoding mode is selected based on the size of data of the encoded macroblock and the degree of distortion between the encoded macroblock and the original macroblock and the macroblock is encoded in the selected encoding mode.

Video encoding using inter prediction compresses video by removing temporal redundancy between pictures, a representative example of which is motion-estimation encoding. Motion-estimation encoding estimates motion of the current picture block-by-block using at least one reference picture and compensates for the estimated motion, thereby encoding a video.

In motion-estimation encoding, a block that is most similar to the current block is searched for in a predetermined search range of a reference picture using a predetermined measurement function. Once the most similar block is found, only a residue between the current block and the most similar block of the reference picture is transmitted, thereby improving the compression rate of video data. For encoding, blocks of various sizes such as 16×16, 8×16, 8×8, and the like may be used.

In order to decode the motion-estimation encoded current block, information regarding a motion vector indicating a displacement between the current block and the most similar block of the reference picture is required. Thus, the information regarding the motion vector is encoded and inserted into a bitstream during encoding. However, if the information regarding the motion vector is encoded and inserted without being separately processed, overhead increases and thus the compression rate of video data is reduced.

To solve the problem, motion-estimation encoding predicts a motion vector of the current block using neighboring blocks around the current block and encodes and transmits only a differential value between a prediction motion vector generated by the prediction and the original motion vector, thereby compressing the information regarding the motion vector. Estimation of the motion vector of the current block using neighboring blocks will be described in more detail with reference to FIGS. 1A through 1D.

FIGS. 1A through 1D illustrate prediction of a motion vector according to the prior art. In FIGS. 1A through 1D, a motion vector of a current block 110 is predicted according to the H.264, standard.

Figure 1A:
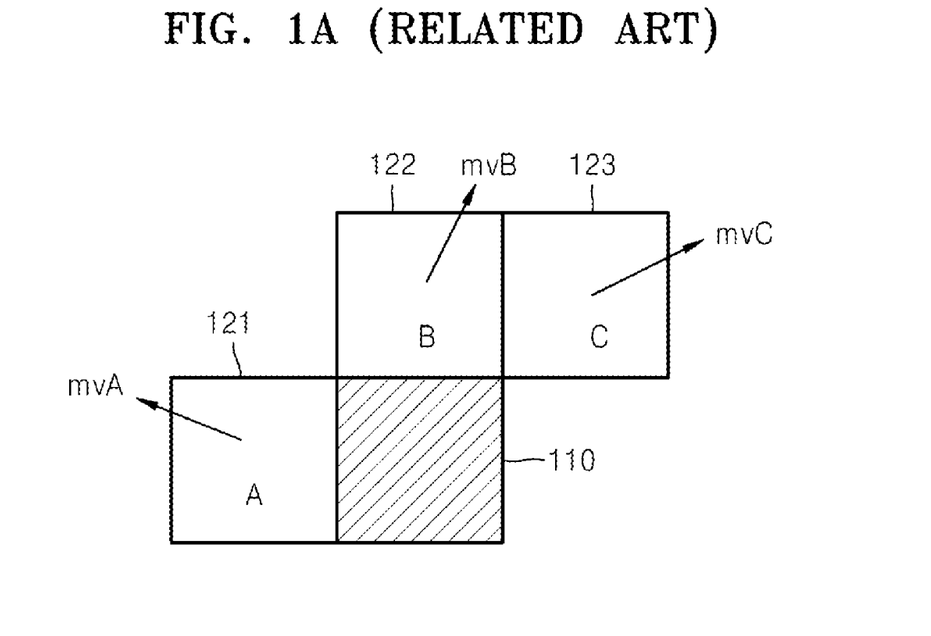
FIGS. 1A through 1D illustrate prediction of a motion vector according to a related art.

In FIG. 1A, the current block 110 is the same as its neighboring blocks 121 through 123 in size. In this case, according to H.264, a prediction motion vector, which is a prediction value of the motion vector of the current block 110, is determined by "prediction motion vector=median value (mvA, mvB, mvC)". Adjacent blocks are likely to be similar to each other and thus the motion vector of the current block 110 is determined as a median value of motion vectors of the neighboring blocks 121 through 123 around the current block 110.

Figure 1B:
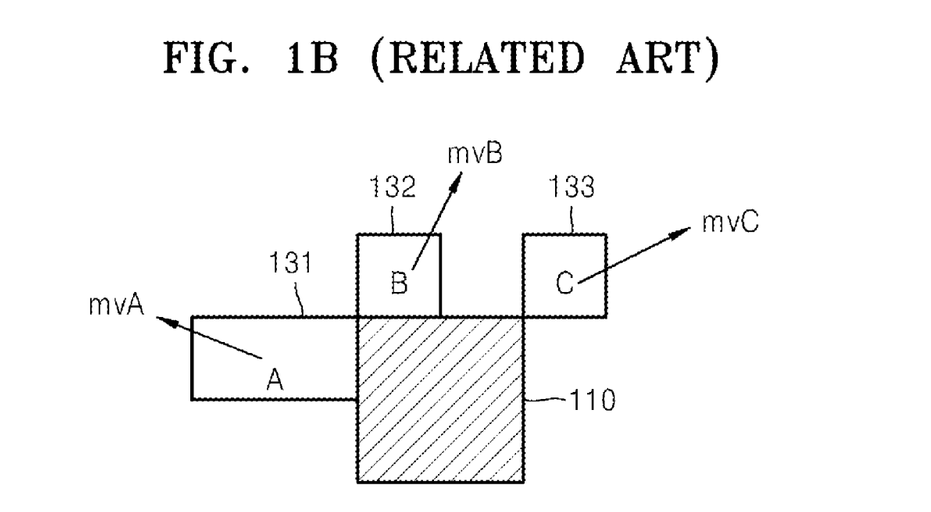

In FIG. 1B, the current block 110 and its neighboring blocks 131 through 133 have different sizes. In this case, a median value of a motion vector of an uppermost block 131 among neighboring blocks located to the left of the current block 110, a motion vector of a leftmost block 132 among neighboring blocks located above the current block 110, and a motion vector of a leftmost block 132 among neighboring blocks located above and to the right of the current block 110 is determined as the prediction motion vector of the current block 110.

Figure 1C:
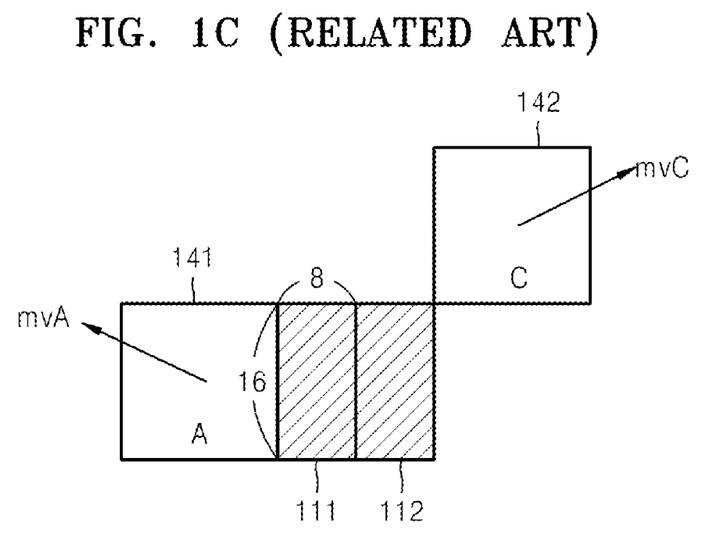

In FIG. 1C, the current block is not square in shape and is an 8×16, block.

When a left portion 111 of a square block including portions 111 and 112 is the current block, a motion vector of a neighboring block 141 located to the left of the current block 111 is determined as the prediction motion vector of the current block 111. On the other hand, when a right portion 112 of the square block is the current block, a motion vector of a neighboring block 142 located above and to the right of the current block 112 is determined as the prediction motion vector of the current block 112.

Figure 1D:
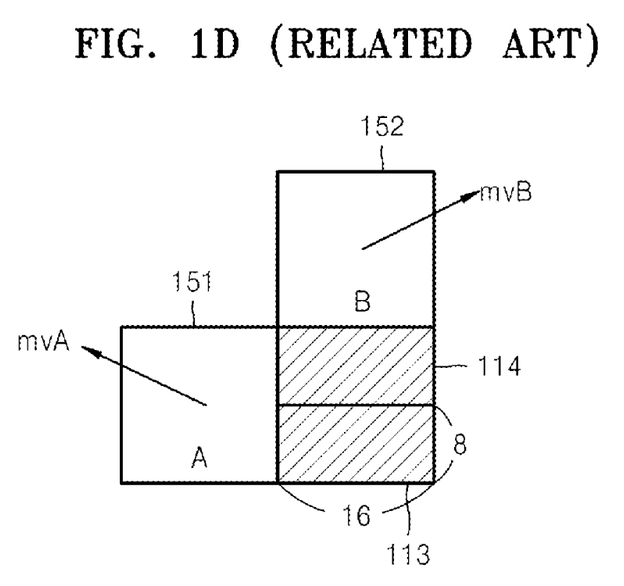

In FIG. 1D, the current block is not a square block and is a 16×8, block.

When a lower portion 113 of a square block including portions 113 and 114 is the current block, a motion vector of a neighboring block 151 located to the left of the current block 113 is determined as the prediction motion vector of the current block 113. When an upper portion 114 of the square block is the current block, a motion vector of a neighboring block 152 located above the current block 114 is determined as the prediction motion vector of the current block 114.

As illustrated in FIGS. 1A through 1D, according to the H.164, standard, the prediction motion vector of the current block is determined based on motion vectors of neighboring blocks around the current block. In other words, the motion vector of the current block is predicted using similarity between adjacent blocks.

Once the prediction motion vector of the current block is determined, a differential value between the prediction motion vector of the current block and the true motion vector of the current block is encoded and inserted into a bitstream. By encoding and then transmitting only the differential value instead of transmitting the information regarding the motion vector, the compression rate of video data can be improved.

However, the prediction motion vector obtained based on neighboring blocks may not be an appropriate prediction value of the motion vector of the current block. The compression rate of video data can be improved only when the prediction motion vector is not much different from the true motion vector. However, if the prediction motion vector is a wrong prediction value and thus the differential value is large, the compression rate of video data is reduced.

Therefore, there is a need for a motion vector prediction method capable of accurately generating a prediction motion vector in order to reduce a differential value between the prediction motion vector and a true motion vector.

SUMMARY OF THE INVENTION

The present invention provides a method of and apparatus for video encoding and decoding based on motion estimation, in which the compression rate of video data is improved by accurately predicting a motion vector using a reference picture and a computer-readable recording medium having recorded thereon a program for implementing the method.

According to one aspect of the present invention, there is provided a method of video encoding. The method includes generating a motion vector by searching a reference picture using pixels of a current block, generating a prediction motion vector that is a prediction value of the motion vector by searching the reference picture using previously encoded pixels located adjacent to the current block, and encoding the current block based on the motion vector and the prediction motion vector.

The generation of the prediction motion vector may include generating a differential value between the motion vector and the prediction motion vector, and the encoding of the current block may include encoding a residue between a prediction value of the current block, which is generated by searching the reference picture using the motion vector, and the current block and the differential value between the motion vector and the prediction motion vector.

The encoding of the current block may include encoding the current block in a skip mode based on the prediction motion vector.

The previously encoded pixels located adjacent to the current block may include neighboring pixels located in at least one of a position to the left of, a position above, or a position above and to the left of the current block.

According to another aspect of the present invention, there is provided an apparatus for video encoding. The apparatus includes a motion vector generation unit generating a motion vector by searching a reference picture using pixels of a current block, a prediction motion vector generation unit generating a prediction motion vector that is a prediction value of the motion vector by searching the reference picture using previously encoded pixels located adjacent to the current block, and an encoding unit encoding the current block based on the motion vector and the prediction motion vector.

The apparatus may further include a differential value generation unit generating a differential value between the motion vector and the prediction motion vector.

According to another aspect of the present invention, there is provided a method of video decoding. The method includes receiving a bitstream including data regarding a current block that has been encoded based on a motion vector generated by searching a reference picture using pixels of the current block and a prediction motion vector that is a prediction value of the motion vector and is generated by searching the reference picture using previously encoded pixels located adjacent to the current block, extracting data regarding the current block and data regarding the motion vector from the received bitstream, and performing motion compensation on the extracted data regarding the current block using the extracted data regarding the motion vector.

The data regarding the motion vector may be a differential value between the motion vector and the prediction motion vector, and the performing of the motion compensation may include generating the prediction motion vector by searching a reference picture using previously decoded pixels located adjacent to the current block, generating the motion vector by adding the extracted differential value to the prediction motion vector, and generating a prediction value of the current block using the generated motion vector.

According to another aspect of the present invention, there is provided an apparatus for video decoding. The apparatus includes a decoding unit receiving a bitstream including data regarding a current block that has been encoded based on a motion vector generated by searching a reference picture using pixels of the current block and a prediction motion vector that is a prediction value of the motion vector and is generated by searching the reference picture using previously encoded pixels located adjacent to the current block, and extracting data regarding the current block and data regarding the motion vector from the received bitstream, and a motion compensation unit performing motion compensation on the extracted data regarding the current block using the extracted data regarding the motion vector.

According to another aspect of the present invention, there is provided a computer-readable recording medium having recorded thereon a program for implementing the method of video encoding and the method of video decoding.

BRIEF DESCRIPTION OF THE DRAWINGS

The above and other features and advantages of the present invention will become more apparent by describing in detail an exemplary embodiment thereof with reference to the attached drawings in which.

DETAILED DESCRIPTION OF THE INVENTION

Hereinafter, an exemplary embodiment of the present invention will be described in detail with reference to the accompanying drawings. It should be noted that like reference numerals refer to like elements illustrated in one or more of the drawings. In the following description of the present invention, a detailed description of known functions and configurations incorporated herein will be omitted for conciseness and clarity.

Figure 2:
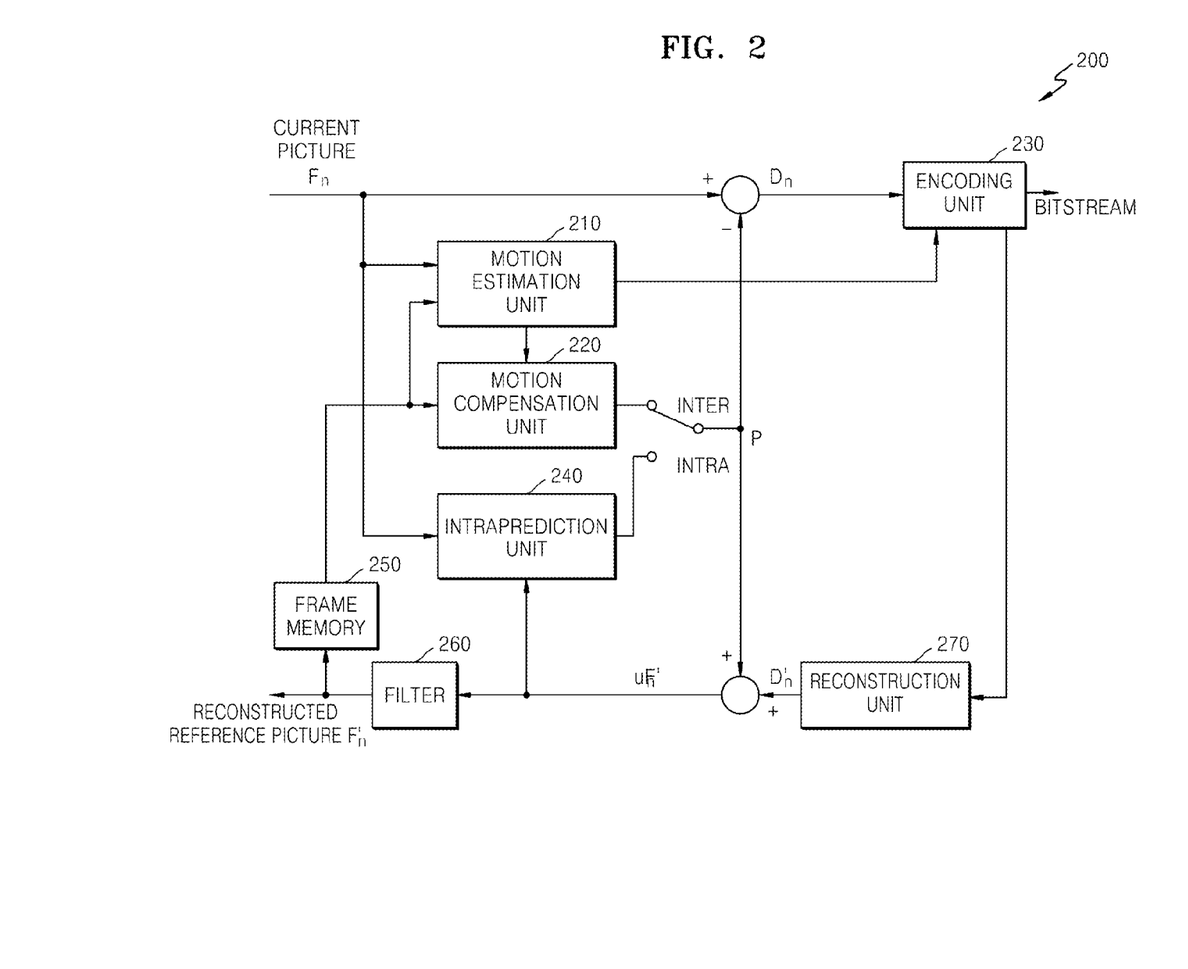
FIG. 2 is a block diagram of a video encoder according to an exemplary embodiment of the present invention.

FIG. 2 is a block diagram of a video encoder including a motion estimation encoding apparatus according to an exemplary embodiment of the present invention. For convenience of explanation, the video encoder is assumed to comply with H.264. However, those of ordinary skill in the art would easily understand that the motion estimation encoding apparatus can also be applied to various video compression methods that perform video encoding using motion estimation.

Referring to FIG. 2, the video encoder 200 includes a motion estimation unit 210, a motion compensation unit 220, an encoding unit 230, an intra prediction unit 240, a frame memory 250, a filter 260, and a reconstruction unit 270. The motion estimation unit 210 and the encoding unit 230 correspond to the motion estimation encoding apparatus according to the present invention.

The intra prediction unit 240 performs intra prediction, i.e., searches in the current picture for a prediction value of the current block to be intra prediction-encoded. In particular, the intra prediction unit 240 receives the current block and performs intra prediction on the current block in a 16×16, intra-prediction mode, a 4×4, intraprediction mode, or an 8×8, intraprediction mode, and an intra chrominance mode.

The motion estimation unit 210 and the motion compensation unit 220 perform inter prediction, i.e., search in a reference picture for a prediction value of the current block included in the current picture.

Figure 3:
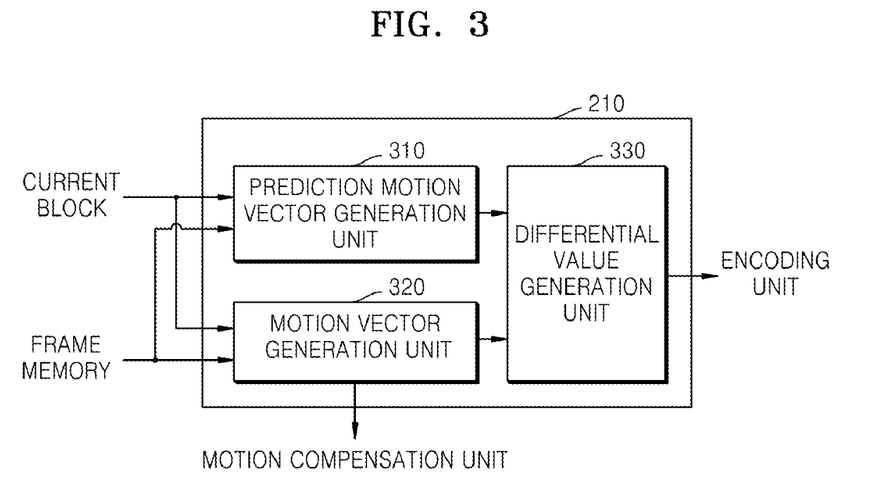
FIG. 3 is a detailed block diagram of a motion estimation unit of a video encoder according to an exemplary embodiment of the present invention.

FIG. 3 is a detailed block diagram of the motion estimation unit 210 of the video encoder 200 according to an exemplary embodiment of the present invention.

Data regarding a reference picture is stored in a frame memory 250 so it can be referred to by the motion estimation unit 210 and the motion compensation unit 220. The motion estimation unit 210 according to the present invention generates a motion vector and a prediction motion vector by referring to the reference picture stored in the frame memory 250. Here, the reference picture may include at least one picture. For example, according to the H.264 standard, a motion vector is generated with reference to a plurality of reference pictures and an optimal block is selected using the generated motion vector for motion compensation.

Referring to FIG. 3, the motion estimation unit 210 according to the present invention includes a prediction motion vector generation unit 310, a motion vector generation unit 320, and a differential value generation unit 330.

The prediction motion vector generation unit 310 generates a prediction motion vector that is a prediction value of a motion vector to be used for motion estimation encoding. Conventionally, the prediction motion vector has been generated with reference to motion vectors of neighboring blocks around the current block. However, the motion estimation unit 210 according to the present invention searches reference pictures using previously encoded pixels that are located adjacent to the current block and generates a prediction motion vector by referring to reference pictures stored in the frame memory 250.

Figure 4:
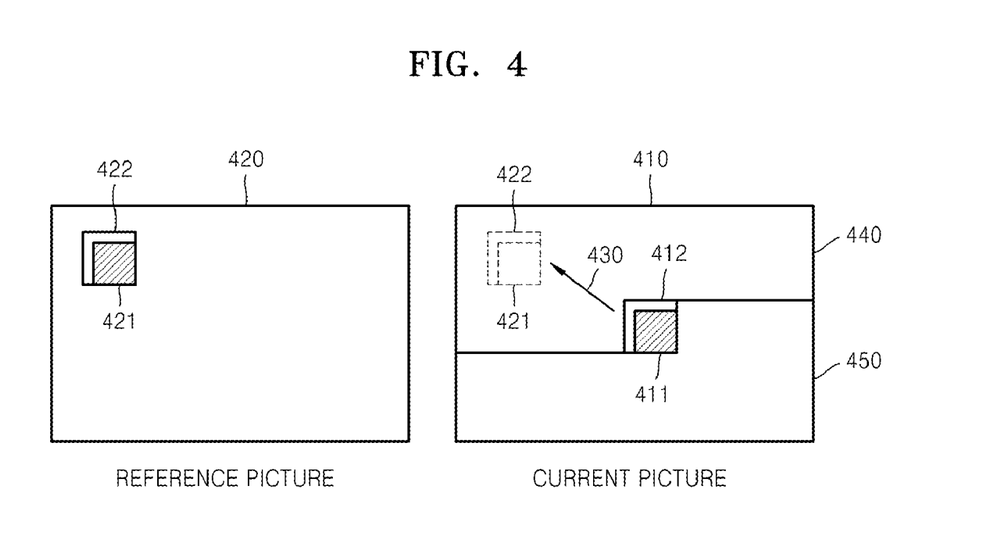
FIG. 4 is a view for explaining a method of predicting a motion vector according to an exemplary embodiment of the present invention.

FIG. 4 is a view for explaining a method of predicting a motion vector according to an exemplary embodiment of the present invention.

In FIG. 4, to perform motion estimation encoding on a current block 411 included in a current picture 410, the motion estimation unit 210 according to the present invention generates a prediction motion vector.

The motion estimation unit 210 according to the present invention predicts a motion vector using pixels 412 located adjacent to the current block 411. To this end, the motion estimation unit 210 searches for most similar pixels 422 in a reference picture 420 using the adjacent pixels 412 and generates a prediction motion vector 430 based on the found most similar pixels 422. By generating the prediction motion vector 430 using the previously encoded pixels 412 located adjacent to the current block 411, the motion vector of the current block 411 can be more accurately predicted than by using motion vectors of neighboring blocks around the current block 411.

To generate the prediction motion vector, only pixels included in a previously encoded region of the current picture 410 are used. Thus, when a video encoded by a method of encoding according to the present invention is decoded, a motion vector is predicted using pixels included in a previously decoded area of the current picture 410 and decoding is performed using the predicted motion vector.

In FIG. 4, the prediction motion vector 430 is generated using pixels located to the left of, above, and above and to the left of the current block 411. However, those of ordinary skill in the art would easily understand that any method of generating a prediction motion vector by searching a reference picture using pixels included in a previously encoded region around the current block 411 can also be applied to the present invention.

Referring back to FIG. 3, the motion vector generation unit 320 searches a reference picture using pixels of the current block 411, thereby generating a true motion vector. Like in the related art, the motion vector is generated by searching a predetermined region of the reference picture. The true motion vector may also be generated by searching only a region within a predetermined pixel range from a point indicated by the prediction motion vector generated by the prediction motion vector generation unit 310.

The differential value generation unit 330 generates a differential value between the prediction motion vector generated by the prediction motion vector generation unit 310 and the true motion vector generated by the motion vector generation unit 320. As mentioned above, since only a differential value is encoded, instead of encoding information regarding the true motion vector, in order to improve the compression rate of video data, the differential value generation unit 330 generates the differential value between the prediction motion vector and the true motion vector.

Since the prediction motion vector generation unit 310 can more accurately generate the prediction motion vector than in the related art, the differential value between the prediction motion vector and the true motion vector is smaller than in the related art. The generated differential value is transmitted to the encoding unit (230 of FIG. 2) where it is encoded and inserted into the bitstream together with data regarding the current block.

Referring back to FIG. 2, the motion compensation unit 220 performs motion compensation on the current block based on the motion vector generated by the motion estimation unit 210. A prediction value of the current block is generated from a reference frame using the motion vector of the current block, which has been generated by the motion vector generation unit 320 of FIG. 3 with reference to the reference picture.

The generated prediction value is subtracted from the current block, thereby generating a residue Dn. The generated residue Dn is encoded by the encoding unit 230.

The encoding unit 230 encodes the residue Dn and the differential value generated by the motion estimation unit 210.

In other words, the residue generated by subtracting the prediction value generated by interprediction or intraprediction from the current block and the differential value between the prediction motion vector and the true motion vector are encoded.

The generated residue is transformed to a frequency domain, is quantized, and then is entropy-encoded, thereby generating a bitstream. At this time, the differential value between the prediction motion vector and the true motion vector is inserted into a syntax overhead.

By accurately generating the prediction motion vector using previously encoded pixels located adjacent to the current block 411 according to the present invention, the differential value between the prediction motion vector and the true motion vector is smaller than in the related art. Therefore, the number of bits used for encoding the differential value can be reduced, thereby improving the compression rate of video data.

Preferably, the encoding unit 230 according to the present invention may also encode the current block 411 in a skip mode. Whether to encode the current block 411 in the skip mode is determined according to a rate-distortion (RD) cost.

Thus, in the skip mode, encoding can be performed with only the prediction motion vector 430, if a block 421 indicated by the prediction motion vector 430 is very similar to the current block 411. Here, the prediction motion vector 430 can be generated from a previously encoded region of the current picture. Thus, encoding of the current block can be completed by encoding 1-bit information indicating that the current block is encoded in the skip mode.

According to the present invention, the prediction motion vector 430 can be generated more accurately than in the related art. As a result, the block 421 indicated by the prediction motion vector 430 is highly likely to be similar to the current block 411. Thus, a possibility of encoding the current block 411 in the skip mode increases, thereby improving the compression rate of video data.

Moreover, according to the present invention, since the prediction motion vector 430 is generated using pixels of a previously encoded region located adjacent to the current block, blocks of any size such as 16×16, 8×8, 4×4, and the like can be encoded in the skip mode unlike in the related art.

The reconstruction unit 270 inversely quantizes and inversely transforms a picture that has been encoded and quantized, to generate a reference picture. The reconstructed picture is stored in the frame memory 250 after passing through the filter 260 that performs deblocking filtering.

Figure 5:
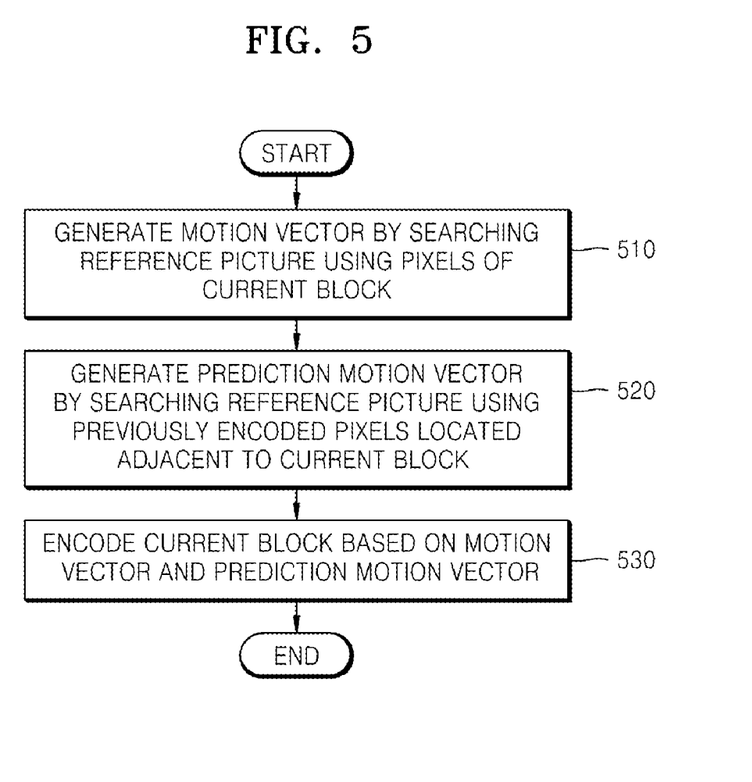
FIG. 5 is a flowchart of a method of video encoding according to an exemplary embodiment of the present invention.

FIG. 5 is a flowchart of a method of video encoding according to an exemplary embodiment of the present invention.

In operation 510, the video encoder according to the present invention searches a reference picture using pixels of the current block, thereby generating a true motion vector of the current block.

In operation 520, the video encoder searches a reference picture using previously encoded pixels located adjacent to the current block, thereby generating a prediction motion vector that is a prediction value of the motion vector of the current block.

The reference picture is searched using neighboring pixels located in at least one of a position to the left of, a position above, or a position above and to the left of the current block, thereby generating the prediction motion vector. Upon generation of the prediction motion vector, the generated prediction motion vector is subtracted from the true motion vector of the current block generated in operation 510, thereby generating a differential value.

In operation 530, the video encoder encodes the current block based on the true motion vector and the prediction motion vector.

In other words, the differential value between the true motion vector generated in operation 510 and the prediction motion vector generated in operation 520 and a residue between a prediction value of the current block generated by motion compensation using the true motion vector and the current block are encoded.

According to the present invention, the current block may be encoded in the skip mode based on the prediction motion vector generated in operation 520. Here, a block encoded in the skip mode may have an arbitrary size such as 16×16, 8×8, 4×4, and the like.

Figure 6:
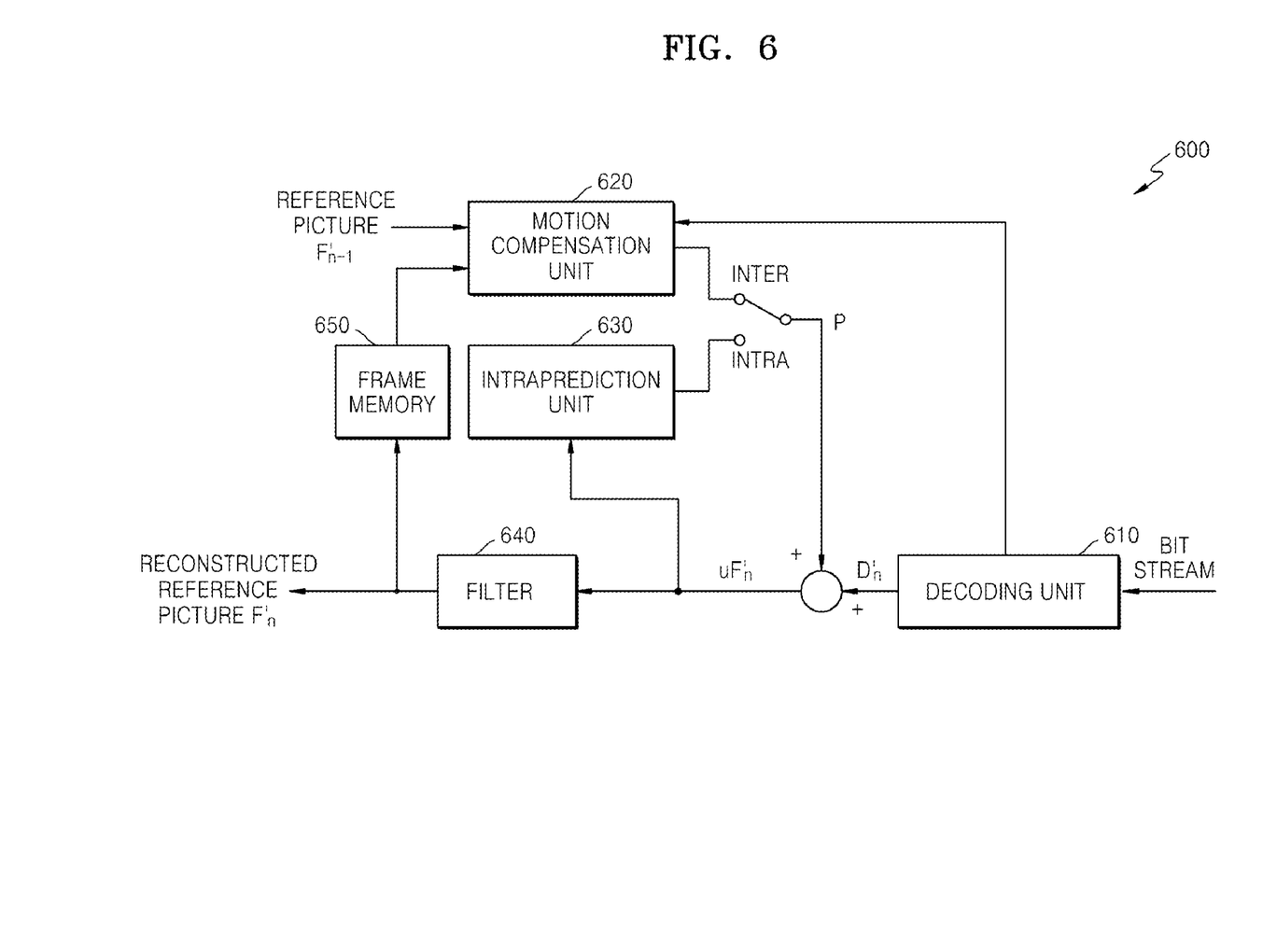
FIG. 6 is a block diagram of a video decoder according to an exemplary embodiment of the present invention.

FIG. 6 is a block diagram of a video decoder according to an exemplary embodiment of the present invention.

Referring to FIG. 6, the video decoder 600 includes a decoding unit 610, a motion compensation unit 620, an intra-prediction unit 630, a filter 640, and a frame memory 650. The decoding unit 610 and the motion compensation unit 620 correspond to a motion estimation decoding apparatus according to the present invention.

The decoding unit 610 receives a bitstream including data regarding the current block that has been encoded based on a true motion vector generated by searching a reference picture using pixels of the current block and a prediction motion vector generated by searching a reference picture using previously encoded pixels located adjacent to the current block, and extracts data regarding the current block and data regarding a differential value between the prediction motion vector and the true motion vector, from the received bitstream.

The bitstream including data regarding a residue with respect to the current block is received and then entropy-decoded, thereby generating quantized coefficients. The quantized coefficients are inversely quantized and inversely transformed, thereby extracting data D'n regarding the residue with respect to the current block.

Since data regarding the differential value between the prediction motion vector and the true motion vector is included in a syntax overhead of the bitstream, it is extracted from the syntax overhead. The extracted data regarding the differential value is transmitted to the motion compensation unit 620 where it is used for motion compensation.

The motion compensation unit 620 performs motion compensation on the data regarding the current block using the data regarding the true motion vector by referring to the current picture and a reference picture stored in the frame memory 650. Inverse processes to processes performed by the motion estimation unit 210 and the motion compensation unit 220 of the video encoder 200 are performed.

Figure 7:
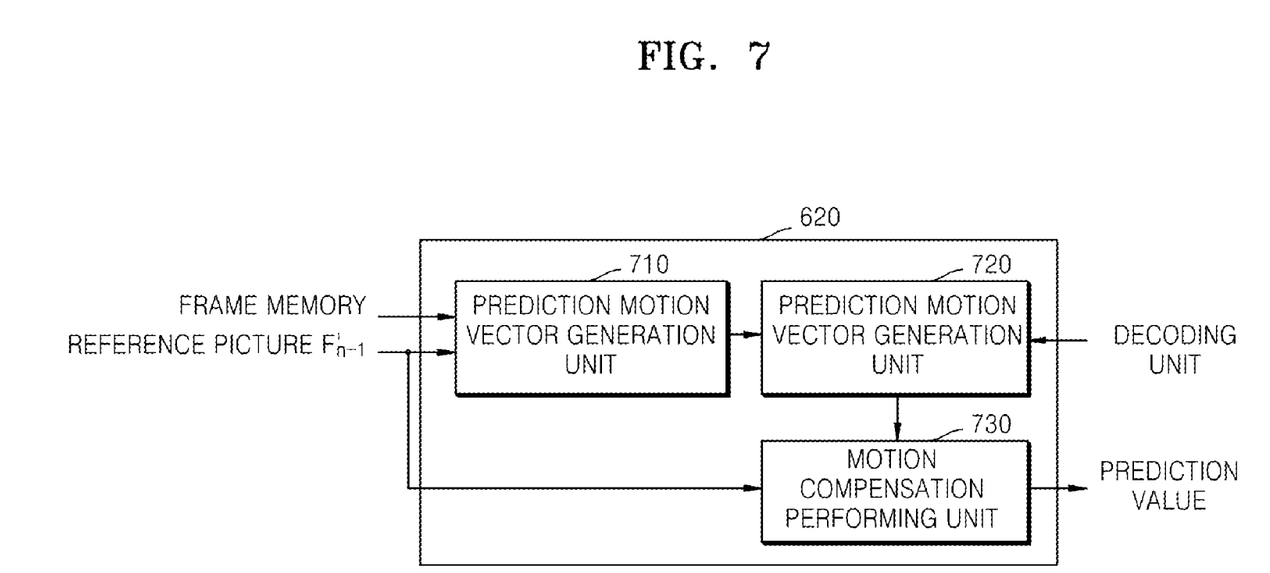
FIG. 7 is a detailed block diagram of a motion compensation unit of a video encoder according to an exemplary embodiment of the present invention.

FIG. 7 is a detailed block diagram of the motion compensation unit 620 of the video decoder 600 according to an exemplary embodiment of the present invention.

Referring to FIG. 7, the motion compensation unit 620 includes a prediction motion vector generation unit 710, a motion vector generation unit 720, and a motion compensation performing unit 730.

The prediction motion vector generation unit 710 generates a prediction motion vector of the current block using previously decoded pixels located adjacent to the current block out of the data regarding the current picture stored in the frame memory 650. Similar pixels are found by searching a reference picture using previously decoded pixels located adjacent to the current block, thereby generating the prediction motion vector of the current block.

The motion vector generation unit 720 generates the true motion vector of the current block using the prediction motion vector generated by the prediction motion vector generation unit 710 and the differential value between the motion vector extracted by the decoding unit 610 and the generated prediction motion vector. The data regarding the true motion vector included in the bitstream only includes the differential value between the true motion vector and the prediction motion vector. Thus, the true motion vector is generated by adding the differential value extracted from the bitstream to the prediction motion vector generated by the prediction motion vector generation unit 710.

The motion compensation performing unit 730 performs motion compensation prediction on the current block by referring to the reference picture using the motion vector generated by the motion vector generation unit 720. A block of the reference picture, which is indicated by the true motion vector, is a prediction value of the current block. However, if the current block has been encoded in the skip mode, a block indicated by the prediction motion vector is a reconstructed block of the current block.

The prediction value generated by the motion compensation performing unit 730 is added to the residue generated by the decoding unit 610, thereby reconstructing the current block. The reconstructed block is deblocking-filtered by the filter 640 and then is stored in the frame memory 650 where it is used for motion compensation of the next block.

Figure 8:
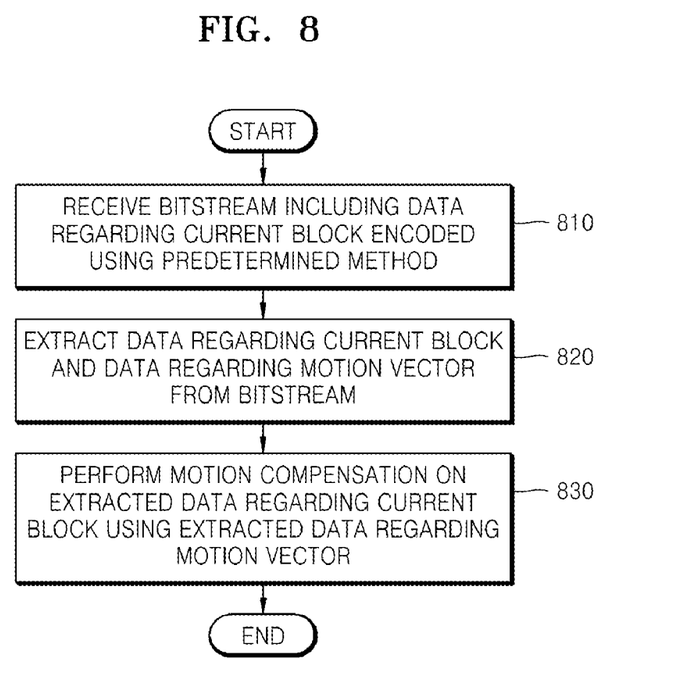
FIG. 8 is a flowchart of a method of video decoding according to an exemplary embodiment of the present invention.

FIG. 8 is a flowchart of a method of video decoding according to an exemplary embodiment of the present invention.

In operation 810, the video decoder 600 receives a bitstream including data regarding the current block that has been encoded based on a motion vector and a prediction motion vector generated using the method illustrated in FIG. 4. In other words, the bitstream including the current block that has been encoded based on the prediction motion vector generated by searching a reference picture using previously encoded pixels located adjacent to the current block is received.

In operation 820, the video decoder 600 extracts the data regarding the current block and the data regarding the true motion vector from the bitstream received in operation 810. The bitstream includes data regarding a residue with respect to the current block and data regarding a differential value between the true motion vector and the prediction motion vector. In operation 820, the data regarding the residue and the data regarding the differential value are extracted.

In operation 830, the video decoder 600 performs motion compensation on the data regarding the current block extracted in operation 820 using the data regarding the motion vector.

The data regarding the motion vector extracted in operation 820 is the differential value between the motion vector and the prediction motion vector. Thus, the prediction motion vector of the current block is generated by searching the reference picture using previously encoded pixels located adjacent to the current block of the current picture and the true motion vector is generated by adding the differential value to the prediction motion vector. The current picture is searched using the generated motion vector, thereby generating the prediction value of the current block. The current block is reconstructed by adding the residue to the generated prediction value.

The present invention can also be embodied as computer-readable information on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, and optical data storage devices. The computer-readable recording medium can also be distributed over network of coupled computer systems so that the computer-readable code is stored and executed in a decentralized fashion.

As described above, according to the present invention, by accurately predicting a motion vector of the current block in the encoding of the current block using the motion vector, a differential value between the motion vector and a prediction motion vector can be reduced, thereby reducing the number of bits required for encoding information regarding the motion vector.

Moreover, by accurately predicting a motion vector of the current block, a possibility of encoding the current block in the skip mode increases, thereby improving the compression rate of video data.

While the present invention has been particularly shown and described with reference to an exemplary embodiment thereof, it will be understood by those of ordinary skill in the art that various changes in form and detail may be made therein without departing from the spirit and scope of the present invention as defined by the following claims.

What is claimed is:

1. A method of video encoding, the method comprising:
generating a first motion vector by searching a reference picture using pixels of a current block;
generating a prediction motion vector that is a prediction value of the first motion vector by searching the reference picture using previously encoded pixels located adjacent to the current block;
generating a differential value between the first motion vector and the prediction motion vector; and
encoding the current block based on the first motion vector and the prediction motion vector,
wherein the encoding of the current block comprises encoding the differential value between the first motion vector and the prediction motion vector.

2. The method of claim 1, wherein the encoding of the current block comprises encoding a residue between a prediction value of the current block, which is generated by searching the reference picture using the first motion vector, and the current block.

3. The method of claim 1, wherein the encoding of the current block comprises encoding the current block in a skip mode based on the prediction motion vector.

4. The method of claim 3, wherein the current block includes one of a 16×16 block, an 8×8 block, and a 4×4 block.

5. The method of claim 1, wherein the previously encoded pixels located adjacent to the current block include neighboring pixels located in at least one of a position to the left of, a position above, or a position above and to the left of the current block.

6. A non-transitory computer-readable recording medium having recorded thereon a program for implementing the method of claim 1.

7. An apparatus for video encoding, the apparatus comprising:
a motion vector generation unit which generates a first motion vector by searching a reference picture using pixels of a current block;
a prediction motion vector generation unit which generates a prediction motion vector that is a prediction value of the first motion vector by searching the reference picture using previously encoded pixels located adjacent to the current block;
a differential value generation unit which generates a differential value between the first motion vector and the prediction motion vector; and
an encoding unit which encodes the current block based on the first motion vector and the prediction motion vector,
wherein the encoding of the current block comprises encoding the differential value between the first motion vector and the prediction motion vector.

8. The apparatus of claim 7, wherein the encoding unit encodes a residue between a prediction value of the current block, which is generated by searching the reference picture using the first motion vector, and the current block.

9. The apparatus of claim 7, wherein the encoding unit encodes the current block in a skip mode based on the prediction motion vector.

10. The apparatus of claim 9, wherein the current block includes one of a 16×16 block, an 8×8 block, and a 4×4 block.

11. The apparatus of claim 7, wherein the previously encoded pixels located adjacent to the current block include neighboring pixels located in at least one of a position to the left of, a position above, or a position above and to the left of the current block.

12. A method of video decoding, the method comprising:
receiving a bitstream including data regarding a current block that has been encoded based on a first motion vector generated by searching a reference picture using pixels of the current block and a prediction motion vector that is a prediction value of the first motion vector and is generated by searching the reference picture using previously encoded pixels located adjacent to the current block;
extracting data regarding the current block and data regarding a differential value between the prediction motion vector and the first motion vector; and
performing motion compensation on the extracted data regarding the current block using the extracted data regarding the differential value motion vector,
wherein the data regarding the differential value motion vector is a differential value between the first motion vector and the prediction motion vector.

13. The method of claim 12, wherein the performing of the motion compensation comprises:
generating the prediction motion vector by searching the reference picture using previously decoded pixels located adjacent to the current block;
generating the first motion vector by adding the extracted differential value to the prediction motion vector; and
generating a prediction value of the current block using the generated first motion vector.

14. The method of claim 13, wherein the previously decoded pixels located adjacent to the current block include neighboring pixels located in at least one of a position to the left of, a position above, or a position above and to the left of the current block.

15. The method of claim 12, wherein the performing of the motion compensation comprises performing motion compensation on the current block in a skip mode based on the prediction motion vector.

16. The method of claim 15, wherein the current block includes one of a 16×16 block, an 8×8 block, and a 4×4 block.

17. An apparatus for video decoding, the apparatus comprising:
a decoding unit which receives a bitstream including data regarding a current block that has been encoded based on a first motion vector generated by searching a reference picture using pixels of the current block and a prediction motion vector that is a prediction value of the first motion vector and is generated by searching the reference picture using previously encoded pixels located adjacent to the current block, and which extracts the data regarding the current block and data regarding a differential value between the prediction motion vector and the first motion vector from the received bitstream; and
a motion compensation unit which performs motion compensation on the extracted data regarding the current block using the extracted data regarding the differential value motion vector,
wherein the extracted data regarding the differential value motion vector is a differential value between the first motion vector and the prediction motion vector.

18. The apparatus of claim 17, wherein the motion compensation unit comprises:
a prediction motion vector generation unit which generates the prediction motion vector by searching a reference picture using previously decoded pixels located adjacent to the current block;
a motion vector generation unit which generates the first motion vector by adding the extracted differential value to the prediction motion vector; and
a motion compensation performing unit which generates a prediction value of the current block using the generated first motion vector.

19. The apparatus of claim 18, wherein the previously decoded pixels located adjacent to the current block include neighboring pixels located in at least one of a position to the left of, a position above, or a position above and to the left of the current block.

20. The apparatus of claim 17, wherein the motion compensation performing unit performs motion compensation on the current block in a skip mode based on the prediction motion vector.

21. The apparatus of claim 17, wherein the current block includes one of a 16×16 block, an 8×8 block, and a 4×4 block.

* * * * *